4 Sheets—Sheet 1.

J. B. BUSHNELL.
SEEDING-MACHINE.

No. 181,521. Patented Aug. 29, 1876.

Witnesses
Geo. G. Dieterich
N. L. Allen

Inventor
John B. Bushnell
per DeWitt C. Allen
Atty.

4 Sheets—Sheet 2.

J. B. BUSHNELL.
SEEDING-MACHINE.

No. 181,521. Patented Aug. 29, 1876.

Witnesses:
Fred. G. Dietrich
N. L. Allen

Inventor
John B. Bushnell
by Dewitt C. Allen
Atty

J. B. BUSHNELL.
SEEDING-MACHINE.

No. 181,521.  Patented Aug. 29, 1876.

4 Sheets—Sheet 3.

Witnesses.
Fred L. Dietrich
N. L. Allen

Inventor.
John B. Bushnell
by DeWitt C. Allen
Atty

J. B. BUSHNELL.
SEEDING-MACHINE.
No. 181,521. Patented Aug. 29, 1876.
4 Sheets—Sheet 4.
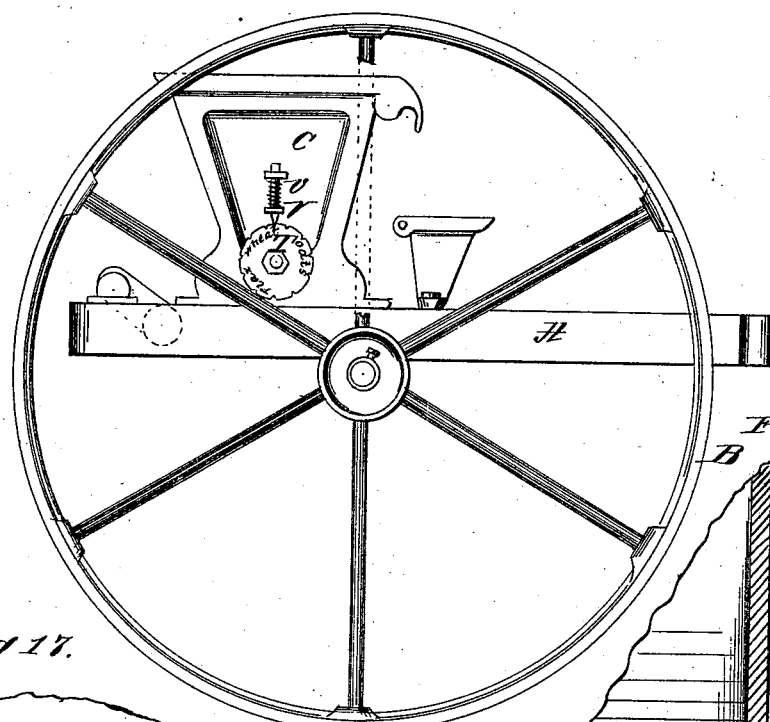
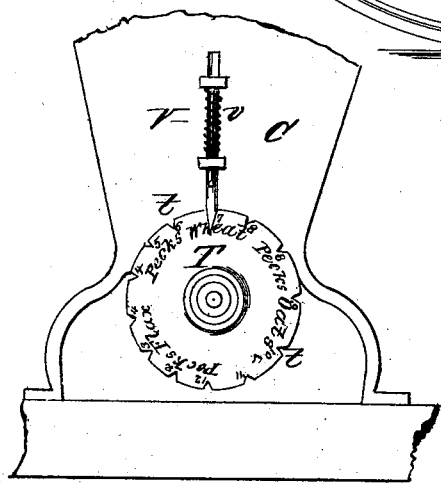
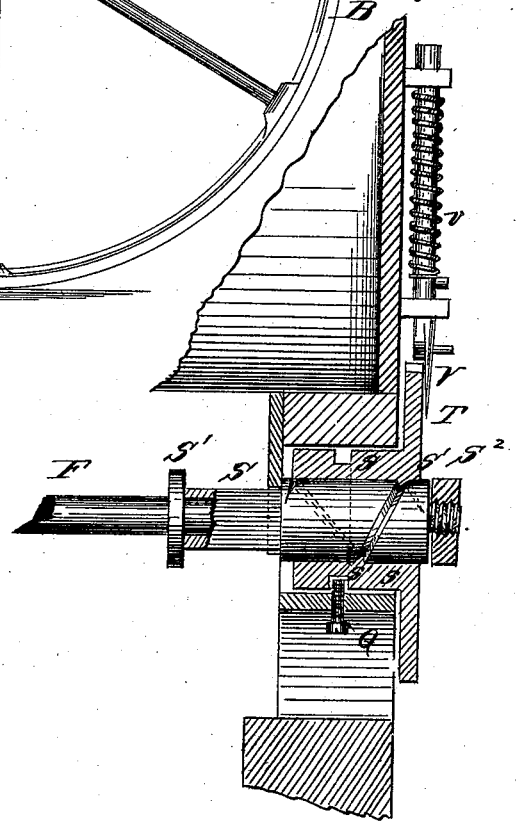
Witnesses.
Rich'd E. Dietrich
N. L. Allen
Inventor
John B. Bushnell
By DeWitt C. Allen
Atty.

UNITED STATES PATENT OFFICE.

JOHN B. BUSHNELL, OF FOND DU LAC, WISCONSIN, ASSIGNOR TO WHEEL AND SEEDER COMPANY, OF SAME PLACE.

IMPROVEMENT IN SEEDING-MACHINES.

Specification forming part of Letters Patent No. 181,521, dated August 29, 1876; application filed July 25, 1876.

*To all whom it may concern:*

Be it known that I, JOHN B. BUSHNELL, of Fond du Lac, in the county of Fond du Lac and State of Wisconsin, have invented certain new and useful Improvements in Seeding-Machines, of which the following is a full, clear, and exact description, reference being made to the accompanying drawings, forming a part of this specification, and in which—

Figure 1:
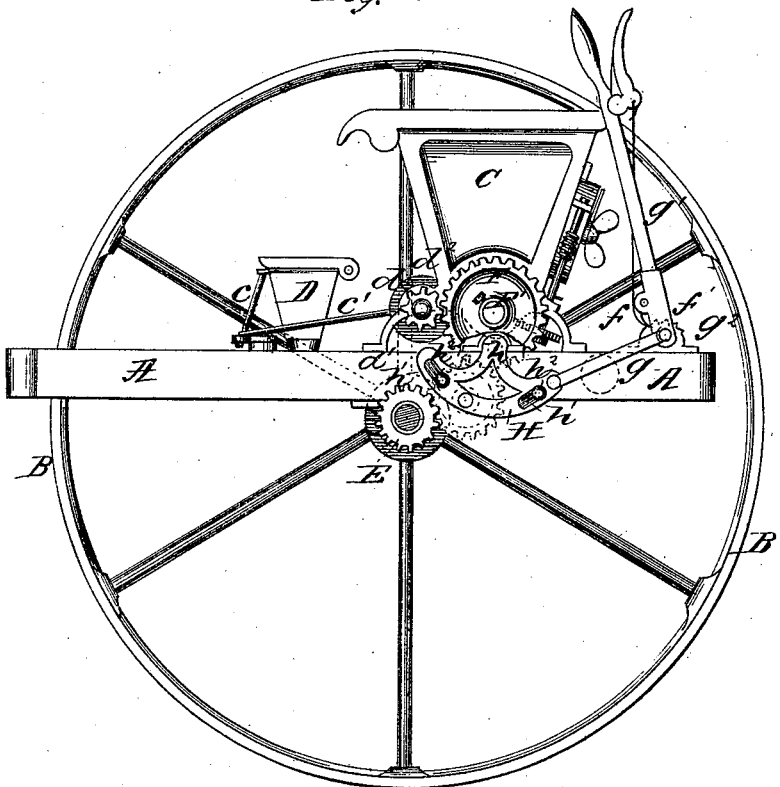
Figure 2:
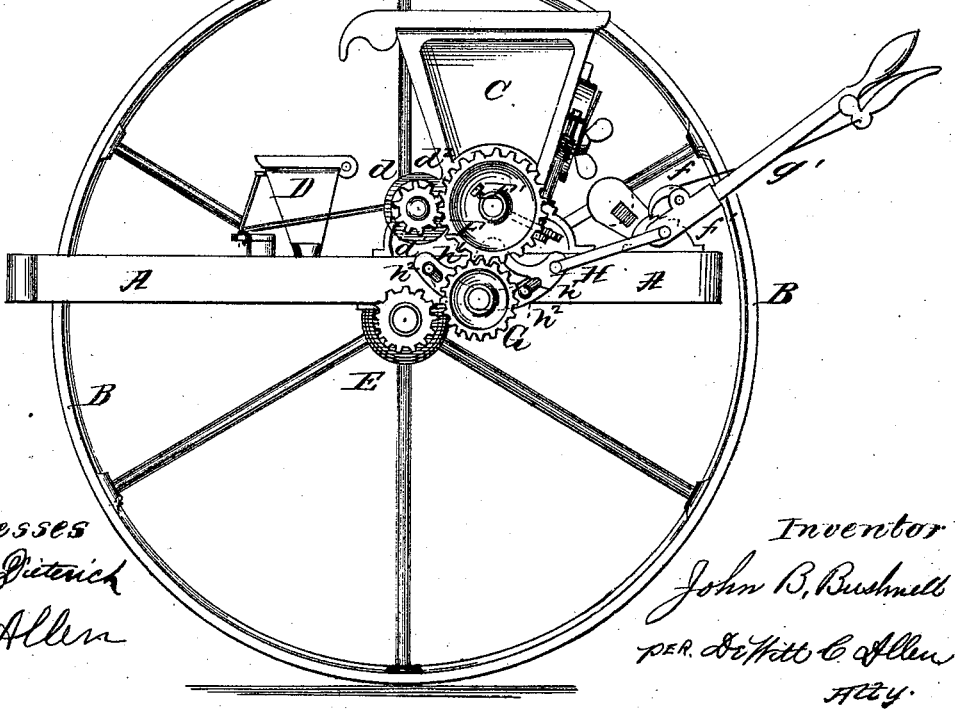
Figure 3:
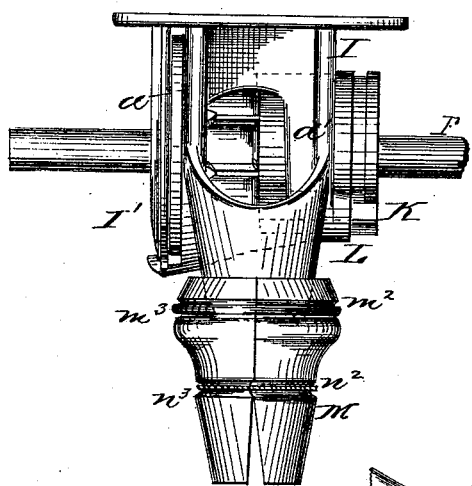
Figure 4:
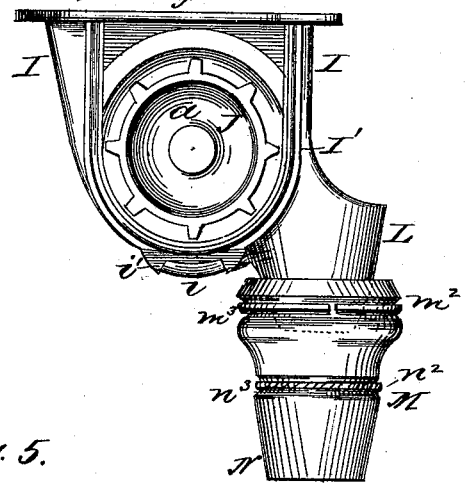
Figure 5:
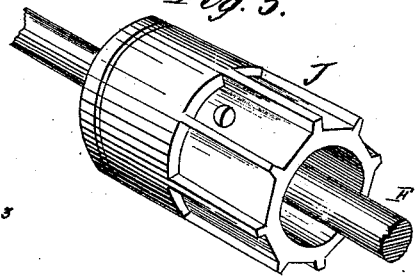
Figure 6:
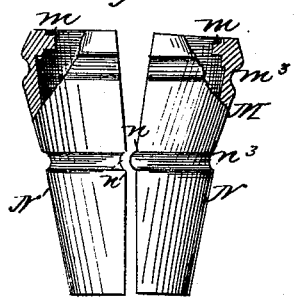
Figures 7, 8:
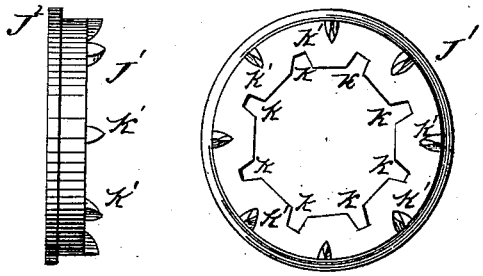
Figure 10:
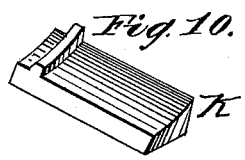
Figure 9:
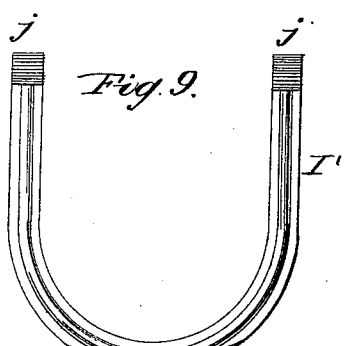
Figure 11:
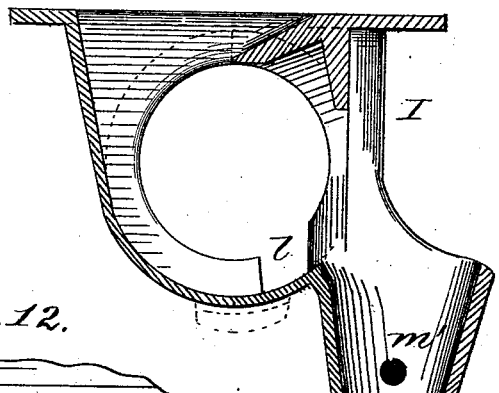
Figure 12:
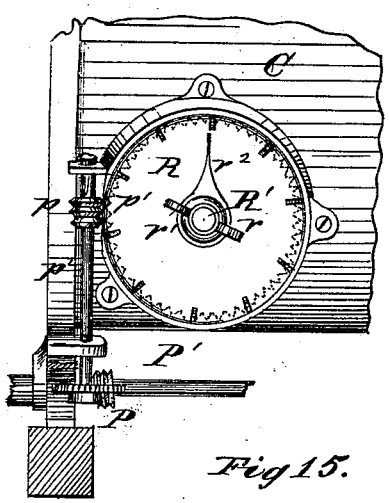
Figure 13:
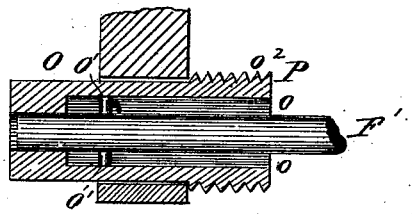
Figure 15:
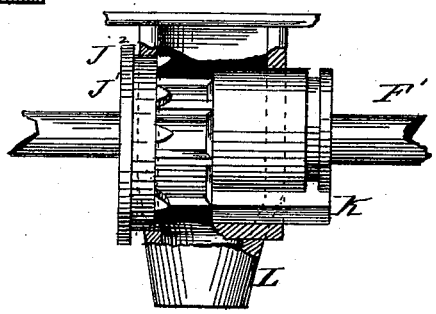
Figure 14:
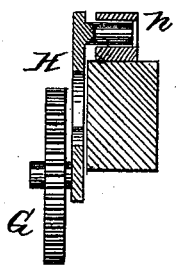

Figure 1 is a side view of the machine, showing the relative position of the gearing when the machine is in operation. Fig. 2 is also a side view of the machine, showing the operating mechanism out of gear with the driving mechanism. Fig. 3 is a rear view of the feed-case, showing the feed-wheel, discharge-spout, and adjustable and removable ring or nozzle. Fig. 4 is a side view of the feed-case, discharge-spout, and adjustable and removable ring or nozzle. Figs. 5, 6, 7, 8, 9, and 10 are detail views. Fig. 11 is a vertical section of the feed-case and discharge-spout. Fig. 12 is a rear view of a portion of the machine, showing the surveying mechanism. Fig. 13 is a detail view, showing the mechanism for revolving the feed-shaft. Fig. 14 is a detail view, showing the manner of pivoting the segmental plate, upon which the intermediate gear is mounted, to the main frame of the machine. Fig. 15 is a sectional view of the feed-case, showing the relative positions of the horizontal feed-wheel and sliding gate. Figs. 16 and 17 are side views of the machine, showing the dial-plate and pointer of the grain-gaging mechanism. Fig. 18 is an enlarged sectional view of the grain-gaging mechanism.

This invention relates to mechanism for throwing the driving mechanism in and out of gear with the operating mechanism, distributing grain from the hopper of seeding-machines, surveying and measuring the area of land sown, and gaging the amount of grain to be distributed; and the invention consists in the construction and arrangement of parts, as will be hereinafter fully described, and pointed out in the claims.

A in the drawing represents a rectangular main frame. B represents the carrying-wheels, mounted upon non-revolving stub-axles, journaled in boxes secured to the under side of the main frame. C represents the grain box or hopper, and D the grass-seed box, secured to the main frame in front of the grain box or hopper. E is the driving-gear, secured to, and revolving with, the carrying-wheel. F is the gear for revolving the shaft F', upon which the feeding mechanism is mounted. G is the intermediate gear, for transmitting motion from the driving-gear to the gear F. The gear G is mounted upon a segmental plate, H, pivoted at $h$ to the main frame of the machine, as clearly shown in Fig. 14, so as to always be in gear with the gear F.

The segmental plate is provided with slots $h^1 h^1$, through which bolts $h^2$ pass, and which allow said plate to move laterally a short distance in either direction, for the purpose of preventing any rocking movement to said plate. This segmental plate is operated through the medium of the connecting-rod $g$ and lever $g^1$, the connecting-rod being pivoted eccentrically to the lever at the point $g^2$, so as to allow the operating mechanism to be thrown out of gear with the driving mechanism before the teeth secured to the adjustable rank leave the ground. This lever $g^1$ is provided with a spring-pawl, $f$, and ratchet $f'$, for securing the segmental plate and intermediate gear out of gear with the driving mechanism. This lever $g^1$ is also used for raising and lowering the rank, upon which the teeth are secured, and with the same movement it receives in throwing the operating mechanism in and out of gear with driving mechanism. I in the drawing represents a feed-case of any convenient size that will receive and support the feed-wheel J and sliding gate K, and L represents the discharge-spout. The feed-case and discharge-spout are both cast in one piece, as clearly shown in Figs. 3, 4, and 11 of the drawings, whereby the trouble and inconvenience in fitting the parts together, when cast in two or more parts, are avoided, and which also reduces the cost of construction. The vertical sides of the feed-case are provided with annular apertures $a\ a'$, whereby the feed-wheel is capable of a longitudinal movement therein for regulating the amount of grain to be distributed. The annular aperture $a$ in the side of the feed-case is for the reception of a hollow rotating cylinder, $J^1$, having an annular projecting flange, $J^2$, cast around its outer end, and which fits against the outer side of the feed-case, when the cylinder is placed therein. This cylinder $J^1$ is secured within the feed-case by a yoke, $I'$. The ends $j$ of the yoke pass up through openings $j'$ in the feed-case, said yoke being securely held in place by the hopper, when the feed-case is secured thereto, and a flange, $i$, on the lower side of the feed-case, fitting in a recess, $i'$, formed in the outer circular portion of said yoke, as clearly shown in Figs. 4 and 9 of the drawings. The cylinder $J^1$ is provided on its interior surface with a series of openings, $k$, corresponding with the flanges on the feed-wheel J, to admit of the feed-wheel having a longitudinal movement through it. The cylinder $J^1$ is also provided with a series of radial flanges or projections, $k'$, which, in connection with the flanges on the feed-wheel J, form a combined horizontal and vertical force feed, as clearly set forth in my patent No. 164,635, and dated June 22, 1875. The aperture $a'$ in the opposite side of the feed-case is so constructed as to permit the shaft $F'$, which carries the feed-wheel, to have a horizontal movement therein without allowing the grain to pass out at that point.

In constructing force-feed seeding-machines in which longitudinally-adjustable ribbed or corrugated feed-wheels are employed it is necessary to provide the feed-case with openings broad enough to permit the maximum amount of grain to be sown. In sowing smaller amounts the feed-wheels are adjusted so that a portion of the carrying-face and a portion of the barrel or smooth part revolve in the grain; but the size of the discharge-opening remains unchanged. Although the smooth part of the feed-wheel does not carry out the grain beyond the carrying-face to an appreciable extent, the grain itself, which is being forced out, (especially if coarse and beardy, or containing sticks and straws,) by its friction on the grain lying next it and beneath the smooth part of the feed-wheel, is apt to carry out more or less beyond the carrying-face of the feed-wheel, and thus varying the amount desired to be sown at such adjustment.

To obviate this defect I employ a small gate or stop, K, in the lower part of the feed-case, which fills the space at or near the point of discharge, and between the turned part of the feed-wheel and the bottom of the feed-channel. This gate or stop is attached to the feed-wheel, so as to permit the feed-wheel to rotate freely, but is adjustable longitudinally with it, so as to maintain at all times the same relative position beneath the feed-wheel. This gate or stop is held from revolving by a groove or channel, $l$, cast in the bottom part of the feed-case, near the discharge-opening, as clearly shown in Figs. 11 and 15 of the drawings.

To avoid the rubbing and wearing of the rubber tube within the tube of the hoe, and the kinking or bending of the same, which causes an irregular flow of the grain through said tube as the hoe changes its relative position while passing over the ground, I construct a ring or nozzle, M, to which the rubber tube is attached, and pivot it to the discharge-spout, whereby the rubber tube will swing to and fro, thereby adapting it to the relative position of the hoe while passing over the ground. This ring or nozzle is provided with two studs or pins, $m\ m$, on its upper interior surface, which fit two corresponding holes, $m^1\ m^1$, formed in the lower part of the discharge-spout. In order to attach this ring or nozzle to the discharge-spout, I cast it into two parts, N N', it being divided longitudinally at right angles to the studs or pins $m\ m$, the part N being provided with lugs $n\ n$ at or near its center, which fit into corresponding recesses $n^1\ n^1$ on the other part, N', and which, when secured together by a wire, $n^2$, in the annular groove $n^3$ surrounding the two parts, form a pivot or hinge, upon which said parts work when the lower ends of the ring or nozzle are compressed together and the upper ends sprung apart, or vice versa. The wire $n^2$ is also used for securing the rubber tube on the ring or nozzle.

The two parts forming the ring or nozzle are made flaring from the lugs and recesses thereon to the lower ends thereof, so that when compressed together at their lower ends, the upper ends thereof will be sprung apart, so as to pass over the end of the discharge-spout, and when the studs or pins enter the holes in the discharge-spout, the upper ends of the ring or nozzle will be sprung together by means of a spring, $m^2$, which fits in an annular groove, $m^3$, surrounding the upper portion of the ring or nozzle. By this construction it will also be perceived that the ring or nozzle can be easily and readily removed, for protecting the rubber tube from the effects of the weather, when the machine is not in use.

For revolving the feed-shaft I employ a sleeve, O, mounted on the gear end of the shaft, having slots $o\ o$ on its inner surface, running nearly or quite its entire length, to admit the projecting points of a metal pin, $o^1$, in the feed-shaft near its end, as clearly shown in Fig. 13. This sleeve is arranged to revolve freely in a box at the end of the machine. On the outer end of the sleeve O I mount the driver or feed-shaft gear F, securing it thereon by a set-screw or other suitable device, while on the inside of the bearing I employ a collar, $o^2$, or its equivalent, to prevent lateral motion of the sleeve. Thus the sleeve and gear are kept from lateral motion, and rotate freely; and said sleeve and gear rotating the feed-shaft and feed-wheels mounted thereon, by means of the pin $o^1$ and slots $o\ o$. The slots also permit the free lateral adjustment of the feed-shaft.

It is becoming customary to provide seeding-machines with mechanism for surveying and measuring the land sown by them. So far as I am informed, they have been largely inoperative, expensive, or so complicated as to require skilled workmen to operate them.

To obviate the above-named objections, I have invented a new arrangement of mechanism for this purpose, which I attach to the side of the hopper, and operate from a sleeve, O, on the feed-shaft, having a screw-thread, P, cut thereon. This screw-sleeve imparts motion to a screw-wheel, $P^1$, secured to the bottom of an upright shaft, $P^2$, which also has a screw-thread, $p$, near the upper end thereof, which in turn imparts motion to a large screw-wheel, $p^1$, incased within a dial-plate, R, attached to the side of the hopper, all as clearly shown in Fig. 12 of the drawings. This last-named screw-wheel has a turned hollow hub, $R'$, projecting through a hole, $r$, in the dial-plate, which hole serves as a bearing for said screw-wheel $p^1$. Through this hollow hub $R'$ a bolt, $r^1$, is passed, which clamps a pointer, $r^2$, tight against the smooth end of the hub $R'$. The pointer has an enlarged base, and performs the double office of pointer and washer, to secure the screw-wheel $p^1$ in its bearing.

By loosening the nut on the bolt $r^1$ the pointer can be readily moved to the starting-point by any one, and screwing up the nut holds the pointer firmly in position. Adjusting the pointer at starting of the machine is all that is required to be done in operating the land-measure, and which can readily be performed and understood by any one who can operate a seeding-machine.

In use, a number of feed-wheels are secured on a shaft, and are arranged so that they are adjustable longitudinally with the shaft. This longitudinal adjustment or movement may be accomplished by a variety of devices, one of which is shown in a former patent granted to me. The object of this adjustment is to increase or diminish the quantity of grain to be sown without changing the speed of the feed-wheels; hence, it is highly important that the mechanism employed for this purpose should be exceedingly accurate and durable, and have no lost motion. In the present instance I employ sleeve, S, bored so that the shaft $F'$ may revolve freely within it, but which is held firmly endwise by one fast and one adjustable collar, $S^1$ $S^2$, or by one fast collar, $S^1$, and a nut, $S^2$, or their equivalents, so that any lateral movement of the sleeve S will be imparted to the shaft $F'$. It is also equally important that any lateral adjustment of the feed-wheels should be correctly registered, so that the operator may be able to sow any desired quantity. To accomplish this I make the sleeve square or flattened a portion of its length, so that it may be held firmly from revolving, but move freely laterally. The balance of its length is turned round and true, and threaded, or a spiral groove, $s'$, cut in its outer surface. To effect a lateral movement of the sleeve S, and, consequently, the feed-wheels, I employ a nut, $s$, which is allowed to rotate freely, but which is held firmly from any lateral movement by a set-screw, Q, or other suitable device. By turning the nut $s$ it will be clearly seen that the shaft will be moved laterally, and the feed increased or diminished, as desired. To form a dial or register plate, T, I enlarge one end of the nut, or, more properly speaking, I form the nut $s$ in the hub of this dial-plate, which revolves with the nut. In the outer edge of this dial-plate, which is made circular in form, I cut notches $t$ at regular intervals, and to the hopper C attach a pointer, V, which drops into these notches whenever they come opposite to it, and holds the dial-plate firmly from turning while operating the machine. Opposite these notches I cut figures denoting the amount of any kind of grain sown per acre at any adjustment. For convenience in lettering this plate and avoiding confusion in letters, I cut the thread or spiral groove $s'$ on such a pitch that one revolution of the dial-plate moves the shaft so as to fully open or fully close the feed. The pointer V is held firmly in the notches by a spiral spring, $v$, or its equivalent, until it is raised out by the operator in changing the adjustment.

To simplify the construction of the machine, I form the bearing for the shaft $d$, upon which the gear $d^1$ and crank-wheel $d^2$ are mounted, in the casting, which forms one end of the grain box or hopper C, as shown in Figs. 1 and 2 of the drawing. The feed-slide of the grass-seed box is operated through the medium of the pivoted connecting-rods $c$ $c'$, crank-wheel $d^2$, shaft $d$, and gear $d^1$, operated from the gear F on feed-shaft.

I do not desire to confine myself to a connecting-rod for operating the segmental plate H, upon which the intermediate gear is mounted, as a chain for throwing the machine out of gear and a spring for throwing it in gear could be substituted therefor without departing from the spirit of my invention.

I claim as my invention—

1. The combination, with the intermediate gear G, of the pivoted and slotted segmental plate H, upon which the gear G is mounted, and guide pin or pins $h^2$ for adjusting the operating mechanism in and out of gear with the driving mechanism, substantially as described.

2. The feed-case I and discharge-spout L, cast in one piece, substantially as herein shown and described.

3. The combination, with the revolving cylinder $J'$, having flange $J^2$ and feed-case I, of the yoke $I'$, for securing the cylinder within said feed-case, substantially as described.

4. The combination, with the feed-wheel J and feed-case having groove or channel $l$ formed in the lower part thereof, of the gate or stop K, arranged below the feed-wheel, and adjustable longitudinally therewith, for filling the space at or near the point of discharge and between the turned part of said feed-wheel and the bottom of the feed-channel, substantially as and for the purpose specified.

5. The adjustable ring or nozzle formed into two parts, N N', having the lugs $n$ and recesses $n^1$, and made flaring at their lower ends, substantially as and for the purpose specified.

6. The combination, with the ring or nozzle formed into two parts, and having their lower portions made flaring, of a spring for holding their upper portions together, in the manner substantially as and for the purpose specified.

7. The combination of the hollow sleeve O, having a slot or slots $o$ on its interior surface, and the feed-shaft F', having a pin or pins, $o'$, for permitting lateral adjustment to the feed-shaft, substantially as and for the purpose specified.

8. The combination, with the dial-plate and pointer secured to the side of the hopper, of the screw-wheel $p^1$, vertical driving-shaft $p^2$, having screw-thread $p$, and screw-wheel $P^1$, screw-sleeve O P, and feed-shaft F', substantially as and for the purpose specified.

9. The combination, with the longitudinally-adjustable feed-shaft F', of the revolving dial-plate T and pointer V, substantially as and for the purpose specified.

10. The combination, with the revolving nut $s$ and dial-plate T and feed-shaft F', of the sleeve S, having a spiral screw-thread or groove, $s'$, cut thereon, substantially as and for the purpose specified.

11. The end of the hopper or grain-box C, having a bearing cast thereon for the shaft $d$, upon which the gear $d^1$ and crank-wheel $d^2$ are mounted, substantially as herein shown and described.

JOHN B. BUSHNELL.

Witnesses:
DE WITT C. ALLEN,
N. L. ALLEN.